United States Patent [19]
Rossetti et al.

[11] Patent Number: 6,166,528
[45] Date of Patent: Dec. 26, 2000

[54] LOSSLESS CURRENT SENSING IN BUCK CONVERTERS WORKING WITH LOW DUTY CYCLES AND HIGH CLOCK FREQUENCIES

[75] Inventors: Nazzareno Rossetti, Danville; Seth Sanders, Berkeley, both of Calif.

[73] Assignee: Fairchild Semiconductor Corporation, South Portland, Me.

[21] Appl. No.: 09/432,916

[22] Filed: Nov. 2, 1999

[51] Int. Cl.[7] .................................................. G05F 1/40
[52] U.S. Cl. ......................... 323/283; 323/284; 323/285
[58] Field of Search .................................. 323/283, 282, 323/284, 290, 285

[56] References Cited

U.S. PATENT DOCUMENTS

| | | |
|---|---|---|
| 3,769,568 | 10/1973 | Hamilton et al. . |
| 4,884,183 | 11/1989 | Sable . |
| 5,134,355 | 7/1992 | Hastings . |
| 5,422,562 | 6/1995 | Mammano et al. . |
| 5,457,624 | 10/1995 | Hastings . |
| 5,528,125 | 6/1996 | Marshall et al. . |
| 5,546,294 | 8/1996 | Schutten et al. . |
| 5,548,206 | 8/1996 | Soo . |
| 5,552,695 | 9/1996 | Schwartz .................................. 323/271 |
| 5,600,234 | 2/1997 | Hastings et al. . |
| 5,617,016 | 4/1997 | Borghi et al. ............................ 323/284 |
| 5,627,460 | 5/1997 | Bazinet et al. . |
| 5,773,966 | 6/1998 | Steigerwald ............................. 323/284 |
| 5,847,554 | 12/1998 | Wilcox et al. ........................... 323/282 |
| 5,955,871 | 9/1999 | Nguyen .................................... 323/282 |
| 5,999,433 | 12/1999 | Hua et al. . |
| 6,031,743 | 2/2000 | Carpenter et al. ......................... 363/65 |

OTHER PUBLICATIONS

R.B. Ridley, "A New, Continuous–Time Model for Current Mode Control", Power Conversion and Intelligent Motion Conference '89, Oct. 1989, pp. 455–464.

Dan M. Sable, et al., "Elimination of the Positive Zero in Fixed Frequency Boost and Flyback Converters," 1990 VPEC Seminar Proceedings, The Eighth Annual Power Electronics Seminar, Sep. 17–19, 1990, VPI&SU, Blacksburg, Virginia, pp. 151–157.

*Primary Examiner*—Shawn Riley
*Attorney, Agent, or Firm*—Townsend and Townsend and Crew LLP; William E. Winters

[57] ABSTRACT

A buck converter having a synchronous rectifier topology that performs current sensing at the low-side switch and employs "valley current control" to terminate a discharging phase and commence a charging phase of the converter. The buck converter is able to withstand high operating frequencies and low duty cycles to produce a low output voltage from a given high input voltage.

28 Claims, 1 Drawing Sheet

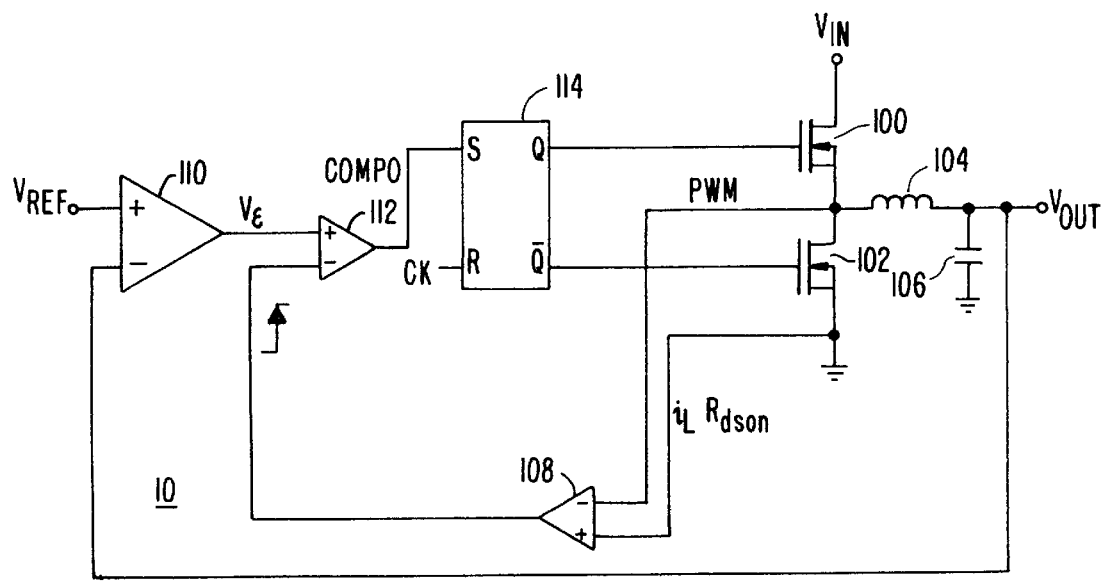
FIG. 1.
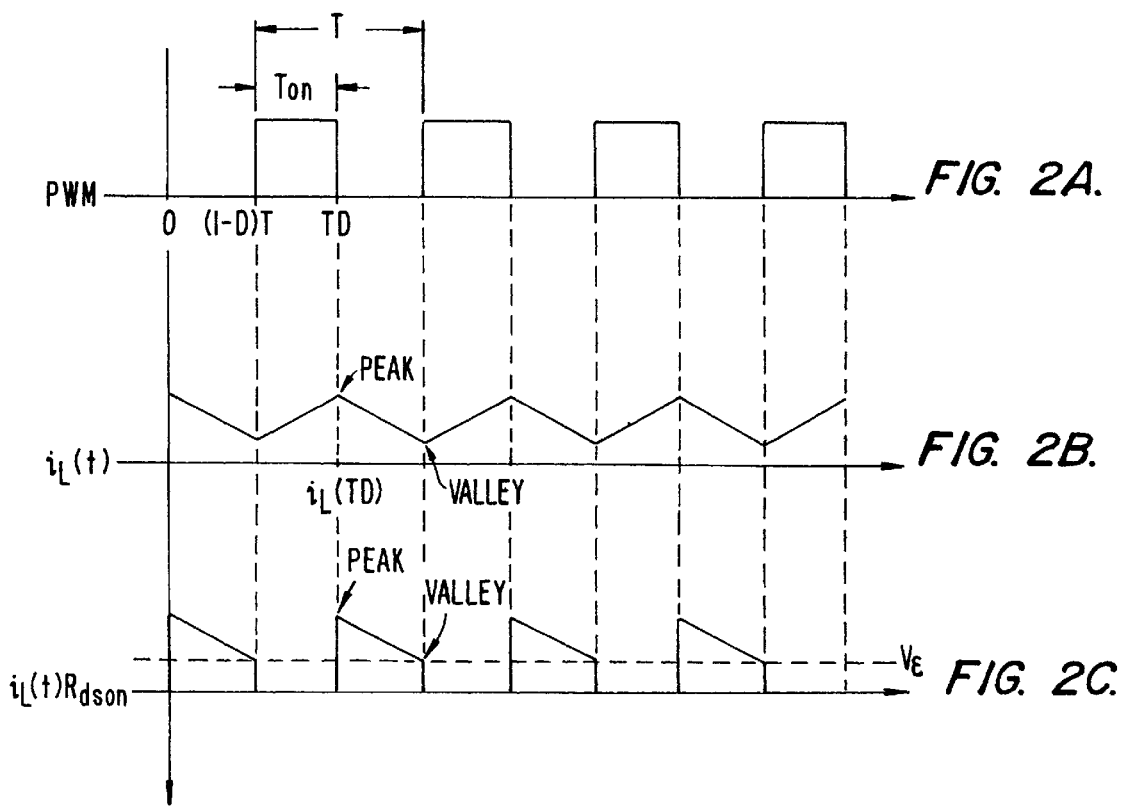
FIG. 2A.
FIG. 2B.
FIG. 2C.

LOSSLESS CURRENT SENSING IN BUCK CONVERTERS WORKING WITH LOW DUTY CYCLES AND HIGH CLOCK FREQUENCIES

BACKGROUND OF THE INVENTION

The present invention relates to power conversion using a buck topology. More particularly, the invention relates to a buck converter having a synchronous rectifier topology characterized by a combination of low-side switch current sensing and valley current control.

A buck converter functions to step down a high voltage to a lower voltage so that it is compatible with, for example, a CPU on a motherboard for a personal computer. Typically, the buck converter operates using a clock, whereby an inductor is charged or energized during a first portion of a clock cycle ("charging phase") and operates as a current source during the second portion of the clock cycle ("discharging phase").

The inductor is normally placed in series with the load (e.g. CPU) and the capacitor is normally placed in parallel with the load. The inductor reduces the amount of ripple in the inductor current, $i_L(t)$, since the current through an inductor cannot change suddenly. Similarly, the capacitor reduces the amount of ripple on the output voltage, $v_o(t)$, since the voltage across a capacitor cannot change suddenly.

A typical buck converter having a synchronous rectifier topology, operates by commencing the charging phase in response to a clock signal. During the charging phase, the inductor, capacitor and load are coupled to the input voltage. Meanwhile, the inductor current, $i_L(t)$, is monitored, and, when it peaks at a predetermined value, the converter is decoupled from the input voltage and the inductor discharges its energy through the load. Because the separation between the charging and discharging phases is defined at the point in time at which the inductor current, $i_L(t)$, peaks at the predetermined value, this type of buck converter is commonly referred to as a "peak current control" buck converter.

The inductor current, $i_L(t)$, rises and falls linearly according to $i_L(t) = \pm(V_L/L) \times t$, where $V_L$ is the voltage across the inductor.

A buck converter can also be characterized as a step-down switch-mode power supply where the average output voltage, $V_{o,avg}$, can be shown to be directly proportional to the converter duty cycle, D. In other words, $$V_{o,avg} = \frac{1}{T}\int_0^{DT} V_{in} dt = DV_{in} \quad (1)$$

where, $DT=T_{on}$, is the portion of the buck converter clock period during which high-side switch 100 is on.

For efficient power distribution to and throughout a system, the power is typically transmitted at a high voltage and a low current to minimize $I^2R$ losses. Accordingly, when the power is distributed to the buck converter for step down, the input voltage, $V_{in}$, is usually quite high. This means that the only practical way of decreasing the average output voltage, for compatibility with low-power electronic devices (e.g. CPU's that operate from a 1.2 voltage source), is to reduce the duty cycle, D, of the converter operating frequency.

Unfortunately, there is a limit on the extent to which the duty cycle, D, can be reduced before the "peak current control" converter becomes dysfunctional. This limit is approached when the duty cycle, D, becomes so small that it becomes difficult to monitor, measure and use it for loop control. The problem becomes worse at higher frequencies.

Because the "peak current control" buck converter is duty-cycle-limited and frequency-limited, it is incapable of meeting the demands dictated by the advancement of technology. As an example, given an input voltage of $V_{in}=12$ volts, a desired output voltage of 1.2 volts, and a clock frequency of 1 MHz, the required duty cycle would be 0.1. With this small duty cycle, however, there would be only 100 nsec of time during which the inductor, capacitor and load would be coupled to the input voltage. Indeed, this length of time is very short and on the order of duration at which the "peak current control" buck converter becomes dysfunctional.

One solution, posed to circumvent the frequency and duty cycle limitations of the "peak current control" converter, contemplates adding "sample" circuitry to the "peak current control" converter, whereby the inductor current, $i_L(t)$, is sampled during the discharging phase. However, because information from this sampling is obtained after the converter has started its discharging phase, the information so obtained can only be utilized during the next clock cycle. Accordingly, with this solution, in addition to sampling the inductor current, $i_L(t)$, further circuitry must be provided to "hold" the current until the next clock cycle. A serious drawback of this solution, therefore, besides the "sample-and-hold" circuitry, which adds complexity to the converter, is that the sample-and-hold mechanism adds a delay or phase shift that threatens the stability of the converter.

What is needed, therefore, is a buck converter architecture that permits current sensing in real time, at high clock speeds and low duty cycles and without the delays and complexities associated with the sample-and-hold technique. Such a solution would comport with the progression towards more efficient power distribution and at the same time provide the ability to achieve a low output voltage that is compatible with state-of-the-art low-voltage electronic devices.

SUMMARY OF THE INVENTION

The present invention discloses a novel buck converter that employs current-sensing during the discharging phase and avails itself of the time at which the inductor current, $i_L(t)$, has discharged to its low point (or "valley") to define the separation between the discharging and charging phases. Accordingly, because the present invention relies on the valley of the inductor current, $i_L(t)$, as opposed to the peak of the inductor current, $i_L(t)$, the buck converter of the present invention can be characterized as a "valley current control" buck converter. And, unlike the "peak current control" converter of the prior art, the "valley current control" converter of the present invention can operate with low duty cycles and high frequencies to achieve a low average output voltage, $V_{o,avg}$.

In one embodiment, the novel "valley current control" buck converter of the present invention is characterized by a synchronous rectifier topology, which includes a high-side switch and a low-side switch connected in series between an input voltage and ground. The buck converter functions to step down the input voltage to an output voltage by comparing a voltage drop across the low-side switch to an error voltage. When the voltage drop across the low-side switch becomes less than the error voltage, the converter is caused to change state by switching from a discharging phase to a charging phase.

In this embodiment, the buck converter comprises a high-side switch; a low-side switch; a current filtering inductor; a voltage filtering capacitor; a current-sense amplifier having an inverting input coupled to the drain of the low-side switch and a noninverting input coupled to the source of the low-side switch; an error amplifier having a noninverting input coupled to the output of the converter and an inverting input coupled to a reference voltage; a comparator having an inverting input coupled to an output of the current-sense amplifier and a noninverting input coupled to an error voltage output of the error amplifier; and a flip-flop having a Set ("S") input coupled to an output of the comparator, a reset input coupled to an external clock, an output coupled to a control input of the high-side switch and a complementary output coupled to a control input of the low-side switch.

The "valley current control" aspect of the present invention together with current sensing at the low-side switch permit the buck converter of the present invention to operate at clock frequencies greater than approximately 1 MHz and at duty cycles of less than approximately 0.1. This allows a larger step down of an input voltage than can be achieved using buck converters of the prior art.

BRIEF DESCRIPTION OF THE DRAWINGS

FIG. 1 is a circuit diagram of the buck converter of the present invention;

FIG. 2A is a timing diagram of the PWM signal, applied to the inductor for the buck converter of the present invention;

FIG. 2B is a timing diagram of the inductor current, $i_L(t)$, for the buck converter of the present invention; and FIG. 2C is a timing diagram of $i_L(t) \times R_{dson}$ for the buck converter of the present invention.

DESCRIPTION OF THE SPECIFIC EMBODIMENTS

An exemplary circuit implementation for a "valley current control" buck converter 10 according to the present invention is shown in FIG. 1. The circuit comprises high-side switch 100, low-side switch 102, inductor 104, filter capacitor 106, current-sense amplifier 108, error amplifier 110, comparator 112 and flip-flop 114. The drain of high-side switch 100 is connected to an input voltage, $V_{in}$, and the source of high-side switch 100 is connected to the drain of low-side switch 102, to a first end of inductor 104 and to the inverting input of current-sense amplifier 108. The second end of inductor 104 is connected to a first end of a filter capacitor 106 and to the buck converter output, $v_o(t)$. Although not shown in FIG. 1, a load is coupled to the $v_o(t)$ terminal when the buck converter 10 is operating. The second end of capacitor 106 is connected to ground. The source of low-side switch 102 is connected to ground and the noninverting input of current-sense amplifier 108. The output voltage, $v_o(t)$, is fed back to the inverting input of error amplifier 110. A reference voltage, $V_{REF}$, is connected to the noninverting input of error amplifier 110. The output of current-sense amplifier 108 is connected to the inverting input of comparator 112 and the output of error amplifier 110, $V_e$, is connected to the noninverting input of comparator 112. The output of comparator 112 is connected to the Set ("S") input of flip-flop 114. The outputs of flip-flop 114, Q and $\overline{Q}$, are coupled to the gates of high-side switch 100 and low-side switch 102, respectively. Preferably, there are buffers between Q and the gate of high-side switch 100 and between $\overline{Q}$ and the gate of low-side switch 102 so that sufficient drive can be imparted to the gates of switches 100 and 102. For the sake of simplicity, these buffers are not shown in FIG. 1. Finally, an external clock signal, CK, is connected to the Reset ("R") input of flip-flop 114. Also, it is preferable that high-side and low-side switches 100 and 102 are n-channel enhancement-mode MOSFETs (as shown in FIG. 1). However, other types of switches can be employed, e.g. p-channel MOSFETs, bipolar junction transistors, and the like.

Operation of the buck converter 10 of the present invention, as shown in FIG. 1, is as follows. It is assumed, for the sake of description, that the buck converter 10 has been operating in a steady state so that the inductor 104 has had the opportunity to energize to a value characteristic of the value obtained during the discharging phase. A rising edge of the CK signal at the Reset ("R") input of flip-flop 114 sets output $\overline{Q}$ of flip-flop 114 high. Under these conditions, high-side switch 100 switches off, low-side switch 102 switches on and the discharging phase commences, during which time inductor 104 operates as a current source that supplies current to the load. The change in current through inductor 104, during the time $0<t<(1-D)T$, i.e. during the discharging phase, is linear and can be characterized by the following expression:

$$\frac{d\,i_L(t)}{dt} = \frac{-v_o(t)}{L} \qquad (2)$$

The change in current during the charging phase is also linear. A timing diagram of the inductor current, $i_L(t)$, is shown in FIG. 2B.

For an average output voltage, $V_{o,avg}$, the inductor current, $i_L(t)$, during the discharging phase, i.e. from $0<t<(1-D)T$, can be determined by integrating Equation (2) from 0 to t:

$$i_L(t) = \frac{-V_{o,avg}}{L} \times t + i_L(0) \qquad (3)$$

While inductor 104 discharges its energy, current-sense amplifier 108 monitors the inductor current, $i_L(t)$, by measuring the drain-to-source voltage drop, $i_L \times R_{dson}$, across low-side switch 102. The output voltage, $v_o(t)$, is fed back to the inverting input of error amplifier 110, which operates to force the average output voltage, $V_{o,avg}$, to a predetermined reference voltage, $V_{REF}$. The output of error amplifier 110 is an error voltage signal, $V_e$, which is connected to the noninverting input of comparator 112. The output of current-sense amplifier 108 is connected to the inverting input of comparator 112. When $i_L \times R_{dson}$ decreases to a value that is equal to the error voltage, $V_e$, as shown in FIG. 2C, comparator 112 changes state and applies a high signal to the Set ("S") input of flip-flop 114. This high level at the Set input causes flip-flop 114 to "set," whereby $\overline{Q}$ becomes low and Q becomes high. A high level at Q turns on high-side switch 100, after which the charging phase commences. Referring to FIG. 2C, it can be seen that the commencement of the charging phase of converter 10 occurs at the valleys of the inductor current, $i_L(t)$.

The benefit of using the "valley current control" converter 10 of the resent invention, as opposed to using a conventional "peak current control" converter, is that the "valley current control" converter 10 can function at higher frequencies and lower duty cycles to achieve a larger step down in voltage. As explained above, this is accomplished by sensing the ample low-side switch signal as opposed to the narrower high-side switch signal.

In summary, the present invention discloses a "valley current control" buck converter, which is capable of operating at high clock frequencies and low duty cycles and in real time to produce an output voltage, from a given a input voltage, $V_{in}$, that is not achievable using conventional "peak current control" converters or other converters that include complex sample and hold mechanisms.

While the above is a complete description of the preferred embodiments of the invention, various alternatives, modifications, and equivalents may be used. Therefore, the above description should not be taken as limiting the scope of the invention, which is defined by the appended claims.

What is claimed is:

1. A valley current control buck converter for stepping down an input voltage to a lower output voltage, said buck converter comprising:
   a high-side switch and a low-side switch coupled in series between an input voltage and ground;
   a current-sense amplifier coupled across said low-side switch and configured to measure a voltage drop across said low-side switch; and
   a comparator coupled to said current-sense amplifier and configured to compare said voltage drop across said low-side switch to an error voltage,
   wherein said comparator switches from a discharging phase to a charging phase when said voltage drop across said low-side switch becomes less than said error voltage.

2. The buck converter of claim 1, wherein said high-side switch and said low-side switch are MOSFETs, the drain of said high-side switch coupled to said input voltage, the source of said high-side switch coupled to the drain of said low-side switch and the source of said low-side switch coupled to ground.

3. The buck converter of claim 2, further comprising:
   an inductor having a first end coupled to said drain of said low-side switch and a second end defining an output of said converter; and
   a capacitor having a first end coupled to said converter output and a second end coupled to ground.

4. The buck converter of claim 3, wherein said current amplifier includes an inverting input coupled to said drain of said low-side switch and a noninverting input coupled to ground.

5. The buck converter of claim 4, further comprising an error amplifier having a inverting input coupled to said output, a noninverting input coupled to a reference voltage and an output defining said error voltage.

6. The buck converter of claim 5, wherein said comparator includes a noninverting input coupled to said output of said error amplifier and an inverting input coupled to said output of said current amplifier.

7. The buck converter of claim 6, further comprising a flip-flop having a set input coupled to an output of said comparator, a reset input coupled to a clock signal, a flip-flop output coupled to the gate of said high-side switch and a complementary flip-flop output coupled to the gate of said low-side switch.

8. The buck converter of claim 7, further comprising a first buffer coupled between said output of said flip-flop and said gate of said high-side switch and a second buffer coupled between said complementary output of said flip-flop and said gate of said low-side switch.

9. The buck converter of claim 8, wherein said discharging phase commences upon a rising edge of said clock signal and said charging phase commences when said output of said comparator changes from a low value to a high value.

10. The buck converter of claim 7, wherein said buck converter is capable of operating with a clock signal having a frequency of greater than approximately 1 MHz.

11. The buck converter of claim 10, wherein said buck converter is capable of operating with a clock signal having a duty cycle of less than approximately 0.1.

12. A buck converter, comprising:
   a high-side switch having a first end coupled to an input voltage;
   a low-side switch having a first end coupled to a second end of said high-side switch and a second end coupled to ground;
   an inductor having a first end coupled to said second end of said high-side switch and a second end defining an output of said converter;
   a filter capacitor having a first end coupled to said output of said converter and a second end coupled to ground;
   a current-sense amplifier having an inverting input coupled to said second end of said high-side switch and a noninverting input coupled to said second end of said low-side switch;
   an error amplifier having an inverting input coupled to said output of said converter and a noninverting input coupled to a reference voltage;
   a comparator having an inverting input coupled to an output of said current-sense amplifier and a noninverting input coupled to an error voltage output of said error amplifier; and
   a flip-flop having a set input coupled to an output of said comparator, a reset input coupled to an external clock, an output coupled to a control input of said high-side switch and a complementary output coupled to a control input of said low-side switch.

13. The buck converter of claim 12, wherein said comparator compares a voltage at said error voltage output to a voltage at said output of said current-sense amplifier, whereby when said voltage at said output of said current-sense amplifier becomes less than said voltage at said error voltage output said flip-flop responds to a high value at an output of said comparator by flipping its output to a high value thereby terminating a discharging phase and initiating a charging phase.

14. The buck converter of claim 13, wherein said discharging phase commences upon a rising edge of said external clock.

15. The buck converter of claim 12, further comprising a first buffer coupled between said output of said flip-flop and said control input of said high-side switch and a second buffer coupled between said complementary output of said flip-flop and said control input of said low-side switch.

16. The buck converter of claim 15, wherein said low-side and high-side switches are transistors.

17. The buck converter of claim 12, wherein said converter is capable of functioning with a frequency of said external clock of greater than approximately 1 MHz.

18. The buck converter of claim 17, wherein said converter is capable of functioning with a duty cycle of said external clock of less than approximately 0.1.

19. A valley current control buck converter, wherein an inductor current of said buck converter is monitored by measuring a voltage drop across a low-side switch of said buck converter, and wherein said voltage drop is compared to an error voltage to cause said converter to switch from a discharging phase to a charging phase when said voltage drop becomes less than said error voltage.

20. A method for converting an input voltage to a stepped-down lower voltage, comprising the steps of:

closing a first switch, to initiate a discharging step through an inductor and an output load;

comparing a signal across said first switch to an error signal during said discharging step, the signal being characteristic of the current through said inductor; and opening said first switch, when said signal characteristic of the current through said inductor becomes less than said error signal, and closing a second switch, to couple said input voltage to said inductor and output load to initiate a charging step.

21. The method of claim 20, wherein said first switch is a transistor having a control input.

22. The method of claim 21, wherein said transistor is a MOSFET and said control input is the gate of said MOSFET.

23. The method of claim 22, wherein said signal characteristic of the current through said inductor corresponds to the voltage dropped across the drain-source path of said MOSFET.

24. The method of claim 23, wherein an output voltage across the output load is directly proportional to the duty cycle of a signal coupled to said gate of said MOSFET.

25. The method of claim 24, wherein said voltage dropped across said drain-source path of said MOSFET decreases as said duty cycle of said signal coupled to said gate of said MOSFET decreases.

26. The method of claim 25, wherein said voltage dropped across said drain-source path of said MOSFET decreases as the frequency of said signal coupled to said gate of said MOSFET decreases.

27. The method of claim 26, wherein said duty cycle of said signal coupled to said gate of said MOSFET is less than approximately 0.1.

28. The method of claim 27, wherein said frequency of said signal coupled to said gate of said MOSFET is greater than approximately 1 MHz.

* * * * *